United States Patent Office 3,793,452
Patented Feb. 19, 1974

3,793,452
USE OF ALKYL-SUBSTITUTED 4-BENZO[b] THIENYL N-ALKYLCARBAMATES AS SYSTEMIC INSECTICIDES
Jerry G. Strong, Fanwood, Harold A. Kaufman, Piscataway Township, and Roger P. Napier, Bridgewater Township, N.J., assignors to Mobil Oil Corporation, New York, N.Y.
No Drawing. Continuation-in-part of abandoned application Ser. No. 11,897, Feb. 16, 1970. This application Jan. 18, 1972, Ser. No. 218,819
Int. Cl. A01n 9/12
U.S. Cl. 424—275        5 Claims

ABSTRACT OF THE DISCLOSURE

Lower alkyl-substituted 4-benzo[b]thienyl N-alkylcarbamates and their 2,3-dihydro derivatives are systemic insecticides. Other compounds, such as unsubstituted 4-benzo[b]thienyl N-alkylcarbamates do not show systemic activity.

REFERENCE TO RELATED APPLICATIONS

This application is a continuation-in-part of copending application Ser. No. 11,897, filed Feb. 16, 1970, now abandoned.

BACKGROUND OF THE INVENTION

Field of the invention

This invention is directed to a method for systemic control of chewing and sucking insects.

Description of the prior art

In United States Letters Patent Nos. 3,288,673 and 3,288,808, there is disclosed a class of benzothienyl carbamates that have a broad spectrum pesticidal activity, including insecticidal and nematocidal. It is the discovery of this invention that a relatively small group within this class can be used for systemic control of insects that threaten agricultural crops. Because a systemic insecticide must be absorbed through the plant roots and translocated to all parts of the plant, few insecticides are found to be systemic.

SUMMARY OF THE INVENTION

This invention provides a method for the systemic control of insects, that comprises the systemic application of a compound or a mixture of compounds having the formula:

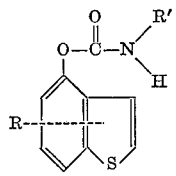

wherein R and R' are alkyl ($C_1$–$C_4$) and R can occupy any one of the 2, 3, 5, 6, or 7 positions in the ring and the 2,3-dihydro derivatives thereof.

DESCRIPTION OF SPECIFIC EMBODIMENTS

As contemplated in this specification and claims, "systemic insecticides" are those, which, when applied to the roots of growing plants, are taken up and translocated by the plant to all parts of the plant, which thereby becomes systemically toxic, i.e., toxic throughout the plant, to chewing or sucking insects feeding on its sap or tissues. "Systemic application," of course, involves such application of insecticides to the roots of growing plants with the aforedescribed toxic results.

The method used to prepare the lower alkyl substituted 4-benzo[b]thienyl N-alkylcarbamates is not an important factor in the method of this invention for systemic control of insects. Typical procedures are demonstrated in the specific working examples set forth hereinafter.

Non-limiting examples of compounds having systemic insecticidal activity in accordance with this inventon are:

2-methyl-4-benzo[b]thienyl N-methylcarbamate,
2-ethyl-4-benzo[b]thienyl N-propylcarbamate,
2-propyl-4-benzo[b]thienyl N-ethylcarbamate,
3-methyl-4-benzo[b]thienyl N-ethylcarbamate,
3-butyl-4-benzo[b]thienyl N-methylcarbamate,
3-propyl-4-benzo[b]thienyl N-methylcarbamate,
5-methyl-4-benzo[b]thienyl N-methylcarbamate,
6-methyl-4-benzo[b]thienyl N-ethylcarbamate,
6-ethyl-4-benzo[b]thienyl N-ethylcarbamate,
6-propyl-4-benzo[b]thienyl N-ethylcarbamate,
6-isopropyl-4-benzo[b]thienyl N-ethylcarbamate,
6-n-butyl-4-benzo[b]thienyl N-ethylcarbamate,
6-isobutyl-4-benzo[b]thienyl N-ethylcarbamate,
6-t-butyl-4-benzo[b]thienyl N-ethylcarbamate,
7-methyl-4-benzo[b]thienyl N-methylcarbamate,
7-ethyl-4-benzo[b]thienyl N-methylcarbamate,
7-propyl-4-benzo[b]thienyl N-methylcarbamate,
7-isopropyl-4-benzo[b]thienyl N-methylcarbamate, and
the 2,3-dihydro derivatives of the foregoing compounds.

The following examples demonstrate the preparation of compounds utilizable as systemic insecticides in accordance with this invention.

EXAMPLE 1

Allyl bromide (59.5 g., 0.49 mole) was added gradually to a cooled solution of 64.8 g. 0.58 mole) 1,3-cyclohexanedione and 32.4 g. (0.58 mole) potassium hydroxide in 130 cc. water, using rapid stirring. When clumps of needle-like crystals started to form, addition of allyl bromide was stopped and 20 percent aqueous potassium hydroxide was added until a solution was effected. Addition of allyl bromide was then completed in about 10 hours. The reaction mixture was added to 200 cc. of 10 percent sodium hydroxide. The solution was extracted with 3 portions of petroleum ether. The remaining aqueous solution was ice cooled and adjusted to pH 5 with concentrated hydrochloric acid. Crystals were filtered off and water washed. Recrystallization from methanol/water (1:3) gave fine needles of 2-allyl-1,3-cyclohexanedione melting at 128° C.

EXAMPLE 2

A 91 g. (0.6 mole) portion of phosphorus oxychloride was added dropwise to a solution of 46 g. (0.3 mole) of 2-allyl-1,3-cyclohexanedione and 52 g. of N,N-dimethylaniline in 300 ml. of chloroform so as to control the temperature near 40° C. Following 4 hours of stirring at ambient temperature, the reaction solution was gently concentrated and cautiously poured over cracked ice so as to control the temperature near 40° C. The resulting mixture was thoroughly extracted with ether, and the ethereal solution was washed with 5 percent sodium hydroxide and with brine, dried and concentrated. The clear liquid obtained weighed 40 g. and was distilled through a short path apparatus to afford 34 g. (0.2 mole; 70 percent) of 2-allyl-3-chloro-2-cyclohexen-1-one; BP 66–69° (0.2 mm.): λ (film) 5.98 (S) μ.

EXAMPLE 3

A solution of sodium hydrogen sulfide was freshly prepared by passing a stream of hydrogen sulfide through a solution of 3.5 g. (0.15 mole) of sodium in 150 ml. of methanol for 2 hours. To this stirred solution was added over 0.5 hour a solution of 25.5 g. (0.15 mole) of 2-allyl-3-chloro-2-cyclohexen-1-one in 50 ml. of methanol. Following the initial exotherm, a 5 g. portion of triethylamine was added, hydrogen sulfide was passed through the then heterogeneous mixture, and the reaction was warmed to 35° C. After another 2 hours, the reaction solution was decanted and gently concentrated. The resulting reddish oil was mixed with 100 ml. of benzene, filtered and concentrated. The remaining liquid was distilled through a short path apparatus to afford 17.4 g. (0.1 mole; 70 percent) of 2-methyl-4-oxo-2,3,4,5,6,7-hexahydrobenzo[b]-thiophene: B.P. 95–105° C. (1.5 mm.); λ (film) 6.05μ; δ (CDCl₃) 3.8 (1H), 3.3 to 1.8 (8H), 1.37 (3H, doublet).

*Analysis.*—Calcd. for $C_9H_{12}OS$: C, 64.27; H, 7.19. Found: C, 64.40; H, 7.25.

EXAMPLE 4

A mixture of 6.7 g. (0.04 mole) of 2-methyl-4-oxo-2,3,4,5,6,7-hexahydrobenzo[b]thiophene and 2.6 g. (0.08 mole) of powdered sulfur in 35 ml. of phenyl ether was heated at 230–245° C. until the evolution of hydrogen sulfide ceased (about 2 hours). The volatile products and diphenyl ether were distilled—B.P. to 165° C. (0.2 mm.), and the distillate was diluted with 400 ml. of ether and thoroughly extracted with 10 percent sodium hydroxide (4 × 65 ml.). The combined base solution was washed with ether, cooled, and neutralized with 12M HCl.

The resulting cloudy suspension was extracted with chloroform (4 × 70 ml.), and the organic solutions were washed with brine, dried, and concentrated. The light yellow liquid residue remaining weighed 2.7 g. and slowly crystallized on standing. A VPC chromatogram and infrared spectrum indicated the presence of a 50:50 mixture of 2,3-dihydro-4-hydroxy-2-methyl benzothiophene and a 4-hydroxy-2-methyl benzothiophene.

EXAMPLE 5

A sample of 7.3 g. (0.44 mole) of hydroxybenzothiophenes (Example 4) was mixed with 3.0 g. (0.05 mole) of methyl isocyanate and a few drops of dibutyltin diacetate in 50 ml. of benzene. The reaction which was initially exothermic was allowed to proceed at ambient temperatures overnight and then at steam bath temperatures for 30 minutes. The reaction solution was filtered while hot and then cooled. The white solid which separated was collected, washed with hexane and recrystallized from methanol-water to provide 2.5 g. of 2-methyl-4-benzo[b]thienyl N-methylcarbamate: M.P. 158–160° C.; λ (KBr) 2.95 (m), 5.81 (s), 8.13 (s), μ; δ (CDCl₃) 7.6 to 6.8 (4H), 5.1 (1H, broad), 2.87 (3H, doublet), 2.53 (3H, singlet) p.p.m.

*Analysis.*—Calcd. for $C_{11}H_{11}NO_2S$: C, 59.72; N, 5.01. Found: C, 59.68; H, 5.14.

EXAMPLE 6

Using fractional crystallization methods, additional portions of 2-methyl-4-benzo[b]thienyl N-methylcarbamate (Example 5) were separated from the above (Example 5) mixture of N-methylcarbamate products. Eventually remaining in the crystallization supernatent liquor was a 50:50 mixture of 2,3-dihydro-2-methyl-4-benzo[b]thienyl N-methylcarbamate and 2-methyl-4-benzo[b]thienyl N-methylcarbamate (Example 6): M.P. 141–145° C., λ (KBr) 2.98 (m), 5.83 (s), 8.15 (s)μ, λ (CDCl₃) 7.6 to 6.8 (3H), 5.1 (1H, broad), 3.98 (1H, multiplet), 2.84 (2H, triplet), 2.82 (3H, doublet), 0.94 (3H, doublet) p.p.m.

EXAMPLE 7

A mixture of 100 g. Dowex 50W–X8 (200–400 mesh) and 90 g. of a 40 percent aqueous solution of pyruvic aldehyde was heated to 90° C. with stirring. To this hot mixture was added a solution of 60 g. of 3-mercaptocyclohexanone in 300 ml. of toluene over a 1 hour period with stirring. The mixture was heated and stirred for another hour. An upper layer formed on cooling which was extracted with ether. The ether layer was dried over magnesium sulfate and reduced in volume. The residual oil was distilled to afford 46 g. (55 percent yield) of 3 - methyl - 4 - oxo-4,5,6,7-tetrahydrobenzo[b]thiophene product; B.P. 88° C. at 0.2 mm. λ (film) 5.95 (s), 7.1 (s), 7.87 (s), 8.34 (m), 10.67 (s), μ; λ (CDCl₃) 1.65 (2H, multiplet), 1.90 (3H, singlet), 1.95 (2H, multiplet), 2.46 (2H, triplet), 6.08 (1H, singlet).

*Analysis.*—Calcd. for $C_9H_{10}OS$: C, 65.08; H, 6.02; S, 19.27. Found: C, 65.03; H, 6.20; S, 19.25.

A mixture of 11.0 g. (0.066 mole) of 3-methyl-4-oxo-4,5,6,7-tetrahydrobenzo[b]thiophene, 15 g. of diphenyl ether and 4.8 g. (0.15 mole) of sulfur was heated to 245° C. During the heating process, a solution formed and hydrogen sulfide gas was evolved. The cooled solution was distilled at 90° C. and 0.5 mm. to afford a pale yellow distillate. This was taken up into ether and extracted with 25 ml. of 5 percent aqueous sodium hydroxide. The basic layer was in turn separated and acidified with hydrochloric acid to afford an off-white solid. This was in turn extracted with chloroform, the chloroform layer was separated, dried and evaporated to give 1.8 g. (17 percent) of colorless hairs, 3-methyl-4-hydroxybenzo[b]thiophene; M.P. 100–101° C.; (KBr) 6.35 (s), 6.9 (s), 8.03 (s), 10.8 (s), 12.95 (s), 13.1 (s), 13.5 (s).

*Analysis.*—Calcd. for $C_9H_8OS$: C, 65.85; H, 4.91; S, 19.48. Found: C, 65.72; H, 5.08; S, 19.67.

A solution of 0.78 g. (0.0048 mole) of 3-methyl-4-hydroxybenzo[b]thiophene in 10 ml. of benzene containing a drop of dibutyltin diacetate was treated with 0.25 g. (0.0043 mole) of methyl isocyanate in a pressure bottle. The solution was heated on a steam bath for 0.5 hour and allowed to cool. Ten ml. of hexane was added and the solution was cooled to 5° C. to afford 0.83 g. (78 percent) of 3-methyl-4-benzo[b]thienyl N-methylcarbamate product; M.P. 131–133° C. as needles. λ (KBr) 3.04 (s), 5.86 (s), 6.5 (s), 7.9 (s), 8.1 (s), 8.53 (m).

EXAMPLE 8

A slurry of 2.6 g. (1.44 moles) of 4-hydroxybenzo[b]thiophene in 650 ml. of water was heated at 85° C. To this was added 525 ml. of a stock sodium hydroxide solution [prepared by dissolving 216 g. (5.4 mole) of sodium hydroxide pellets in 1100 ml. of water]. The resultant basic solution was then treated dropwise with 270 g. of dimethyl sulfate over a one hour period at a reaction temperature of 95–100° C. This acidic solution was stirred further for one hour, at 100° C. Another 40 ml. of dimethyl sulfate was added followed by stirring for 15 minutes. Then 85 ml. of the stock sodium hydroxide solution was added followed by stirring for 15 minutes. Then 85 ml. of the stock hydroxide solution was added followed by another 40 ml. of dimethyl sulfate. The reaction was kept at 100° C. during these and subsequent additions. The addition of 85 ml. of the stock sodium hydroxide solution and 40 ml. of dimethyl sulfate was repeated twice more. The remainder of the stock sodium hydroxide solution was then added and the reaction was stirred overnight at room temperature. After this time, the reaction mixture was extracted with ether. The ether was washed with 10 percent sodium hydroxide and then with water. The ether layer was dried over Drierite and stripped to afford a liquid which was distilled at 0.55 mm. and 83–85° C. There was obtained 201 g. of material (85 percent yield). The infrared spectrum was consistent for 4-methoxybenzo[b]thiophene: λ (film) 6.33 (s), 6.8 (s), 7.79 (s), 9.5 (s), and 13.3 (s) microns, δ

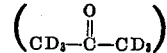

3.5 (3H, singlet, 6.36 (1H, doublet), 7.3 (4H, multiplet). Fifty grams (0.37 mole) of N-methyl formanilide was added dropwise to 50 g. (0.33 mole) of phosphorus oxychloride over a 0.5 hour period. At first an orange oil formed but a pasty solid was formed upon stirring for an additional 15 minutes. Then, 50 g. (0.31 mole) of 4-methoxybenzo[b]thiophene was dropwise. The pasty solid took on a dark color and gradually became fluid. This portion of the reaction was allowed to exotherm to 50° C. The reaction was then heated at 60–70° C. for three hours and allowed to cool. A saturated aqueous solution containing 120 g. (1.46 mole) of sodium acetate was added slowly with cooling. Control of the exotherm in this step is important. After all of the sodium acetate had been added, the mixture was stirred for an hour and allowed to stand overnight. After this time, the top dark oil layer and the aqueous layer were both decanted from the semi-solid precipitate. Ethanol (100 ml.) was added and the yellow crystalline product was collected by suction filtration. There was obtained 35 g. (60 percent) of material; yields as high as 70 percent were obtained in other attempts. The crude product 4-methoxy-7-formylbenzo[b]thiophene had M.P. 106–107° C. λ (KBr) 5.99 (s), 6.43 (s), 6.83 (s), 7.88 (s), 8.11 (s), 9.4 (s), 9.7 (s), 13.94 (s), μ.δ

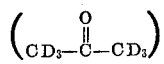

3.89 (3H, singlet), 6.85 (1H, doublet), 7.55 (3H, multiplet), 11.67 (1H, singlet). A mixture of 67 g. (0.35 mole) of 4-methoxy-7-formylbenzo[b]thiophene, 61 g. of 85 percent hydrazine hydrate, 43 g. of sodium hydroxide, and 550 ml. of diethylene glycol was refluxed for 1 hour. Solution was not complete after this time. The reflux condenser was removed and heating was continued until the reaction temperature reached 195° C. during which time a solution had formed. The reflux condenser was replaced and the solution was refluxed for three hours. After this time, an equal volume of water was added and the oily mixture was steam distilled until the distillate was clear. The distillate was saturated with sodium chloride and extracted with methylene chloride. The organic layer was dried, and evaporated to yield an oil which was distilled at 133° C. and 6.0 mm. There was obtained 29 g. (47 percent) of product, 4-methoxy-7-methylbenzo[b]thiophene: λ (film) 6.34 (s), 6.8 (s), 7.9 (s), 9.46 (s), 12.36 (s), 12.98 (s), 14.33 $\mu^{mn}$.

A mixture of 21.1 g. (0.12 mole of 4-methoxy-7-methylbenzo[b]thiophene and 63 g. of pyridine hydrochloride was heated to reflux for 1 hour. After cooling, the mixture was acidified with dilute hydrochloric acid and extracted with chloroform. The organic layer was dried over magnesium sulfate and evaporated. The residual liquid was distilled at 0.35 mm. and 130° C. to afford 15.7 g. of product (81 percent) yield. λ (film) 2.7 (s), 6.3 (s), 6.6 (s), 6.8 (s), 7.2 (s), 7.46 (s), 7.88 (s), 9.5 (s), 10.85 (s), 12.3 (s), 13.0 (s) $\mu^{mu}$. The product, 4-hydroxy-7-methylbenzo[b]thiophene, solidified on standing; M.P. 80–83° C. Into a pressure bottle was placed 5.0 g. (0.03 mole) of 4-hydroxy-7-methylbenzo[b]thiophene, 20 ml. of benzene, 5 ml. of dry ether, 1 drop of dibutyltin diacetate, and 1.7 g. of methyl isocyanate. The bottle was capped and warmed to 60° C. with a steam bath. After a few minutes, a solid mass had formed. The solid was collected with a suction filter and washed with some 3:1 hexane: benzene. There was obtained 4.1 g. (62 percent) of product, 7-methyl - 4 - benzo[b]thienyl N-methylcarbamate: M.P. 146–148° C. λ (KBr) 2.95 (s), 5.82 (s), 6.5 (s), 6.83 (s), 8.04 (s), 8.5 (s), δ (CDCl₃) 2.52 (3H, singlet), 2.87 (3H, doublet), 7.1 (2H, singlet), 7.35 (2H, doublet). Analysis.—Calcd. for C₁₁H₁₁NO₂S, percent): C, 59.72; H, 5.01; N, 6.33. Found: C, 60.22; H, 4.97; N, 6.37.

EXAMPLE 9

A solution of 96 g. (1 mole) of 2-cyclo-hexen-1-one and one gram (0.01 mole) of triethylamine in 500 ml. of benzene was placed in a side-arm suction flask. A glass fritted tipped gas inlet tube was fitted to the mouth of the flask with a one-holed rubber stopper. The side arm was used as a gas outlet to caustic traps. Care was taken to ensure that the fritted tip was below the surface of the solution which was stirred with a magnetic stirring bar. The solution was cooled to 10° C. and gaseous hydrogen sulfide was added over a twelve hour period or until v.p.c. analysis showed that 2-cyclohexanone was consumed to the extent of 95 percent. Solvent, excess hydrogen sulfide, and triethylamine were then removed with a rotating evaporator at 10 mm. with a pot temperature of no higher than 40–50° C. The neat liquid obtained in this manner should be used immediately. Crude weight of product 3-mercaptocyclohexanone, varied between 125 and 145 g. in each of several runs. A solution of 225 g. of crude 3-mercaptocyclohexanone in 675 ml. of toluene was mixed with 220 g. of Dowex-X8 ion exchange resin (200–400 mesh). Then, 121 g. of 2,3-butanedione was added all at once and the mixture was stirred and refluxed for 48 hours. The progress of the reaction could be determined by vapor phase chromatography. Product appeared at 10 min. (2'XE–60 column programmed to start at 150° C. and heated at a rate of 10° C. per min.). The reaction mixture was filtered and the filtrate was washed with 10 percent sodium hydroxide solution and then with water. The organic layer was dried over Drierite and most of the toluene was removed with a rotating evaporator. The liquor was distilled and a fraction boiling at 90–94° C. and 0.3 mm. was collected as the 2,3-dimethyl-4-oxo-4,5,6,7 - tetrahydrobenzo[b]thiophene product (27 g.): λ (film) 5.96 (s), 7.1 (s), 7.87 (s).

Analysis.—Calcd. for C₁₀H₁₂OS: C, 66.65; H, 6.71; S, 17.76. Found: C, 66.84; H, 6.80; S, 17.87.

A mixture of 11 g. (0.061 mole) of 2,3-dimethyl-4-oxo-4,5,6,7-tetrahydrobenzo[b]thiophene with 15 g. diphenyl ether and 4.8 g. (0.15 mole) of sulfur was heated at 245° C. for 45 min. The cooled mixture was poured into 100 ml. of methylene chloride. The methylene chloride solution was extracted with 10 percent sodium hydroxide solution. The basic aqueous layer was then acidified to produce a dark red oil. This was distilled at 120° C. and 1.0 mm. to afford 2.0 g. (19 percent) of a yellow liquid which solidified on standing. This was recrystallized from hexane to give colorless crystals of 2,3-dimethyl-4-hydrobenzo[b]thiophene: M.P. 83–84°; λ (KBr) 3.0 (s), 6.3 (s), 6.9 (s), 7.25 (s), 10.85 (s), 1297 (s), and 13.6 (s). A solution of 1.8 g. (0.01 mole) of 2,3-dimethyl-4-hydroxybenzo[b]thiophene in 15 ml. of hexane along with a drop of dibutyltin diacetate was treated with 0.75 ml. of methyl isocyanate in a pressure bottle. The cap was sealed and the reaction solution was heated on a steam bath for 0.5 hour. Upon cooling, the product crystallized to afford 2.1 g. (89 percent) 2,3-dimethyl-4-benzo[b]thienyl N-methylcarbamate: M.P. 127–129°; λ (KBr) 3.0 (s), 5.85 (s), 6.5 (s), 6.85 (s), 7.06 (s), 7.9 (s), 8.1 (s), 9.0 (s), 10.5 (s), 12.5 (s), 13.35 (s), and 13.5 (s) microns. δ (CDCl₃) 2.26 (3H, singlet), 2,33 (3H, singlet), 2.75 (3H doublet), 5.25 (1H, broadened singlet), and 7.25 (3H, multiplet).

Analysis.—Calcd. for C₁₂H₁₃NO₂S: C, 61.27; H, 5.57; N, 5.96. Found: C, 61.08; H, 5.60; N, 6.15.

EXAMPLE 10

The compound 4 benzothienyl N-methyl-carbamate, used for comparison purposes, is disclosed and claimed in U.S. Pat. Nos. 3,288,673 and 3,288,808.

The following procedures were used in testing for systemic insecticidal activity.

Bean aphid (Aphis fabae)

Young lima bean seedlings growing in a sand-soil medium are removed and the roots thoroughly washed. The roots of the seedlings are immersed immediately in test tubes containing a nutrient solution containing 50 p.p.m.

concentration of the material under test. Three days later, the seedlings are infested with 10 adult aphids by careful transfer with a camel's hair brush. Each treatment is replicated two times. The percent mortality is recorded 48 hours after the seedlings are infested.

Mexican bean beetle (*Epilachna varivestis Muls.*)

Similar to the method described for the bean aphid, except that 5 fourth instar larvae are used.

Boll weevil (*Anthonomus grandis*)

Similar to the test described for the Mexican Bean Beetle, except that cotton seedlings are used and the plants are infested with 10 adult weevils after 24 hours.

Two-spotted spider mite (*Tetranychus telarius Linnaeus*)

The roots of young lima bean seedlings (roots washed) are placed in test tubes containing 60 p.p.m. solutions of the test material. After 72 hours, mites are introduced by placing inverted mite-infested leaves on the test plants. Sepcial "Gro-Lux" lighting is needed to provide for healthy growth of the plants during the test. The percent mortality is recorded 72 hours after the seedlings are mite infested.

The compounds of Examples 5 through 10 were subjected to the aforedescribed systemic insecticide tests. Results are set forth in the table. In the table, the insect species are abbreviated as follows: Bean aphid—BA; Mexican bean beetle—MB; boll weevil—BW; and two-spotted spider mite—SM.

TABLE

| Compound of example: | BA | MB | SM | BW |
|---|---|---|---|---|
| 5 | 100 | 100 | 60 | 80 |
| 6 | 100 | 100 | 70 | 100 |
| 7 | 80 | 100 | 90 | |
| 8 | 0 | 90 | 70 | 20 |
| 9 | 0 | 0 | 0 | 0 |
| 10 | 0 | 0 | 0 | 0 |

From the data in the table, it will be apparent that the mono-alkyl substituted carbamates are effective systemic insecticides. On the other hand, the di-substituted (Example 9) and the unsubstituted (Example 10) compounds are not effective.

In order to achieve effective systemic insecticidal control, the systemic insecticides contemplated herein are applied through the soil to the roots of growing plants to be protected, in an insecticidially effective amount. Although the insecticides can be applied, per se, they are usually applied as the active ingredients of compositions with liquid or solid carriers. As applied, the effective concentration may be as low as 0.0005 weight percent and as high as 0.05 weight percent. In some cases, however, stronger doses up to about 10 weight percent may be required. These systemic insecticides can be applied as single compounds or as mixtures of two or more of these systemic insecticides.

Although the present invention has been described with preferred embodiments, it is to be understood that variations and modifications may be resorted to, without departing from the spirit and scope of this invention, as those skilled in the art will readily understand. Such modifications and variations are considered to be within the purview and scope of the appended claims.

What is claimed is:

1. A method for the systemic control of chewing and sucking insects, that comprises the systemic application to the roots of a plant of an insecticidally effective amount of a compound of the formula:

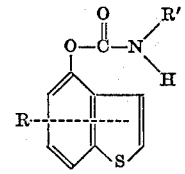

wherein R and R' are methyl and R can occupy any one of the 2, 3, 5, 6, or 7 positions in the ring; whereby said compound is absorbed through the plant roots and translocated to all parts of the plant thereby contacting said insects.

2. The method of claim 1, wherein the compound is 2-methyl-4-benzo[b]thienyl N-methylcarbamate.

3. The method of claim 2 wherein the compound is in admixture with 2,3-dihydro-2-methyl-4-benzo(b)-thienyl N-methylcarbamate, said compounds being present in a 50:50 mixture.

4. The method of claim 1, wherein the compound is 3-methyl-4-benzo[b]thienyl N-methylcarbamate.

5. The method of claim 1 wherein the compound is 7-methyl-4-benzo[b]thienyl N-methylcarbamate.

References Cited

UNITED STATES PATENTS 3,288,673  11/1966  Kilsheimer _____ 424—2.75

ALBERT T. MEYERS, Primary Examiner

L. SCHENKMAN, Assistant Examiner

U.S. Cl. X.R.

424—Dig. 8

PO-1050
(5/69)

UNITED STATES PATENT OFFICE
CERTIFICATE OF CORRECTION

Patent No. 3793452        Dated 2-19-74

Inventor(s) J. G. STRONG, H. A. KAUFMAN & R. P. NAPIER

It is certified that error appears in the above-identified patent and that said Letters Patent are hereby corrected as shown below:

Col. 4, line 54, after "stock" insert -- sodium --

Col. 5, line 5, after "was" insert -- added --

Col. 5, line 71, "60.22" should be -- 60.02 --

Col. 6, line 18, "Dowex-X8" should be -- Dowex 50W-X8 --

Col. 6, lines 45 & 46, "hydro-benzo[b]thiophene" should be -- hydroxybenzo[b]thiophene --

Col. 7, line 17, "60 ppm" should be -- 50 ppm --

Signed and sealed this 9th day of July 1974.

(SEAL)
Attest:

McCOY M. GIBSON, JR.
Attesting Officer

C. MARSHALL DANN
Commissioner of Patents